Oct. 26, 1926.

A. FUTTER

HARROW SEAT

Filed Sept. 16, 1925   2 Sheets-Sheet 1

1,604,897

Alfred Futter, INVENTOR.

BY

Geo. P. Kimmel, ATTORNEY.

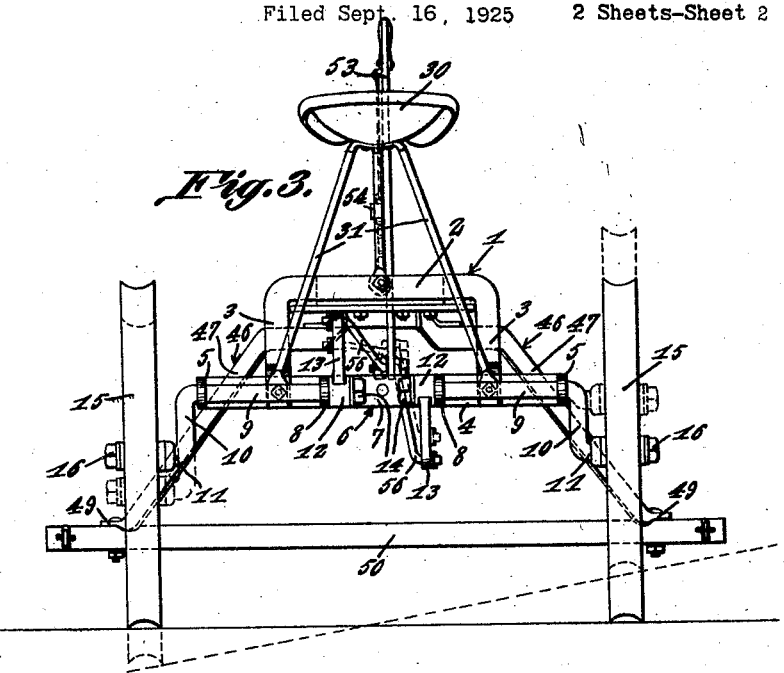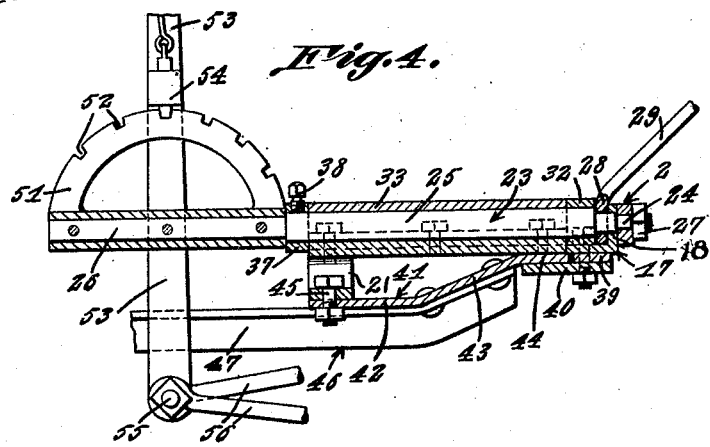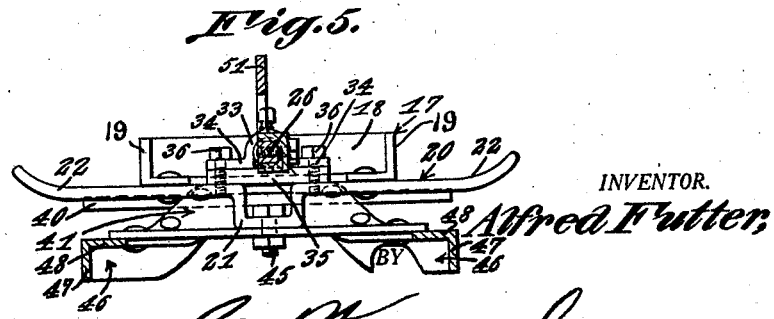

Patented Oct. 26, 1926.

1,604,897

UNITED STATES PATENT OFFICE.

ALFRED FUTTER, OF GARFIELD, WASHINGTON.

HARROW SEAT.

Application filed September 16, 1925. Serial No. 56,739.

This invention relates to riding attachments for harrows.

The primary object of this invention is the provision, in a manner as hereinafter set forth, of an attachment for harrows whereby the attendant will be able to ride behind the harrow instead of walking as is the usual custom.

A further object of the invention is the provision, in a manner as hereinafter set forth, of a riding attachment for harrows having a new and novel means whereby the supporting wheels of the attachment may be shifted to suit the slope of the ground over which the device is traveling, to maintain the driver's seat of the attachment always in a horizontal and upright position.

A further object of the invention is the provision, in a manner as hereinafter set forth, of a riding attachment for harrows having means connecting between the harrow and the attachment whereby upon the turning of the harrow no turning of the attachment will take place until the harrow has nearly completed its turn thus allowing the implement to be turned in a small space and allowing quicker and easier turns to be made.

Still another object of the invention is the provision, in a manner as hereinafter set forth, of a riding attachment for harrows having connecting means between the attachment and the harrow to enable the harrow to pass over or along the sloping land while the attachment is upon the level or ground of a different slope, without straining the connecting means between the harrow and attachment.

The final object of the invention is the provision, in a manner as hereinafter set forth, of a riding attachment for harrows which is of simple construction, strong and durable, easily and quickly manipulated to adapt the implement to the ground over which it is passing, and inexpensive to manufacture and set up.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Figure 3 is a rear elevation of the attachment.

Figure 4 is a longitudinal section taken upon the line 4—4 of Figure 2.

Figure 5 is a transverse section taken upon the line 5—5 of Figure 2.

Figure 1:
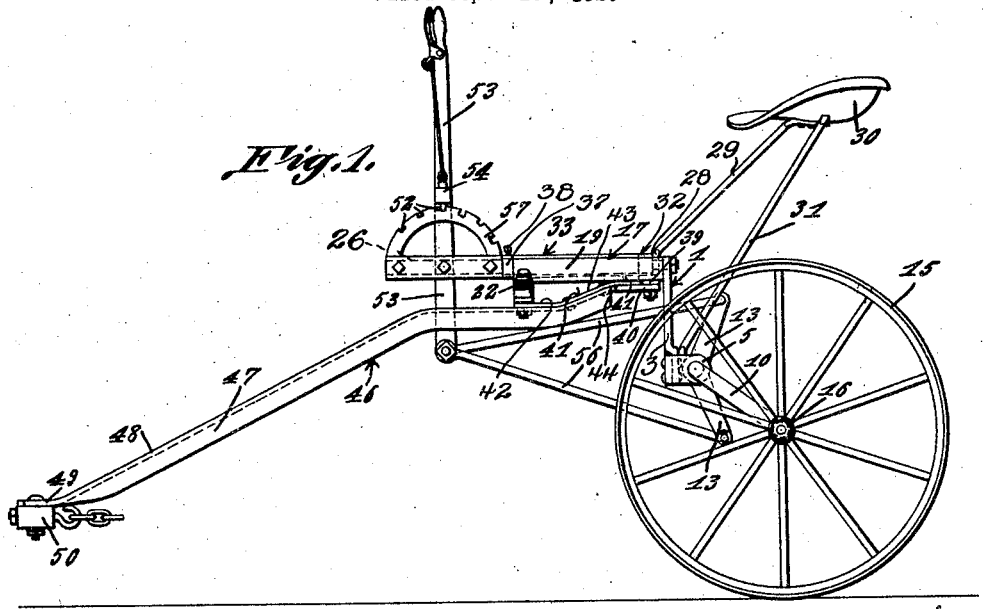
Figure 1 shows the riding attachment embodying this invention, in side elevation.

Referring now to the drawings in detail wherein like numerals of reference indicate corresponding parts throughout the several views, there is indicated by the numeral 1 an inverted substantially U-shaped frame structure. This frame structure comprises the horizontal yoke bar 2 and the downwardly extending parallel legs 3.

The lower ends of the legs 3 of the frame are connected by a transversely extending beam 4 which as shown extends beyond the sides of the frame 1 and terminates in the rearwardly extending bearing arm 5.

Secured to the back of the beam 4 at the central portion thereof, is a substantially U-shaped member indicated generally by the numeral 6 and comprising the elongated yoke 7 the back of which is secured against the back of the beam 4 and the short rearwardly extending bearing legs 8. These legs 8 like the legs 5 are apertured and these apertures are in alignment transversely of the structure and are designed to act as axial bearings as will be hereinafter described.

Extending through each outer and the adjacent inner one of the bearings 5 and 8, is a stub shaft or axle 9, the outer end of each of which is turned at right angles as indicated at 10 and this right angled portion terminates in a terminal right angled portion 11 which terminal portion extends parallel with the axle body 9 of which it is a part. The inner end of each of the axles carries thereon a collar 12, from each of which there extends an arm 13.

Upon the inner end of each of the axles 9 there is threaded a securing nut 14 which retains the collars 12 thereon and also retains the axles in position in their respective bearings 5 and 8.

Upon the portion 11 of each of the axles a traction wheel 15 is mounted and retained in position by the nut 16.

Extending forwardly from the frame 1, is a substantially U-shaped frame structure indicated generally by the numerals 17 and this frame structure has the yoke portion 18 secured against the face of the yoke portion 2 of the frame 1, and extending at right angles from the ends of this yoke portion 18 are the relatively long parallel legs 19. The legs and yoke portion 19 and 18 respectively of the member 17 are formed of angle bar material as is clearly shown in Figures 2 and 4.

Extending transversely of the legs 19 and connecting the forward ends of the same, is a beam indicated generally by the numeral 20 which beam has a depending U-shaped central portion 21 while the outer ends thereof extend a substantial distance beyond the sides of the legs 19 to set up the foot rest 22.

Extending forwardly from the frame 1, from the central portion of the yoke 2 is a shaft 23 of substantial length and having the rear end thereof reduced as at 24 and extended through the yoke 2 and through the central portion of the yoke 18 of the member 17. The intermediate portion of the shaft 23 is round as indicated at 25 while the forward portion thereof is flattened as indicated at 26. A securing nut 27 may hold the reduced portion 24 tightly against the yoke 2 as shown in Figure 4 or the reduced portion 24 may be welded to the yoke 2, and secured about this reduced portion 24 of the shaft is one end 28 of a brace standard 29 which is connected to the underside of a driver's seat 30. This driver's seat as shown is supported by the legs 31, the lower ends of which are bolted to the lower ends of the legs 3 of the frame 1.

A collar 32 encircles the rear end of the round portion 25 of the shaft 23 and bears against the lower end 28 of the brace 29 as shown in Figure 4 and overlying the portion 25 of the shaft is an elongated substantially semi-circular bearing 33 having the laterally extending flanges 34 integral therewith. Lying beneath the portion 25 of the shaft, is an elongated bearing plate 35 which is secured to the flanges 34 by the bolts 36. At the outer end of the bearing 33 a collar 37 is secured about the portion 25 by the set screw 38. The foot rest portions 22 of the bar 20 are also secured to and beneath the bearing plate 35.

Extending beneath and secured to the underside of the yoke 18 of the frame 17 is a spacer plate 39 and secured against the underside of this spacer plate 39 is a wear plate 40 which, as shown in Figure 4 is of greater length than the spacer plate 39 thus setting up a space between the underside of the bearing plate 35 and the plate 40.

Arranged beneath the shaft 23 and the structure supported thereon, is a draft arm supporting plate indicated generally by the numeral 41. This plate 41 is relatively broad at its forward end and arranged in horizontal manner as indicated at 42 and rearwardly from this horizontal broad forward end portion, is an upwardly inclined portion 43 which merges with a rear tongue portion 44 which is substantially parallel with the portion 42 and of materially less width than the portion 42. This tongue portion 44 is designed to be arranged between the plate 40 and the underside of the bearing plate 35 while the broad forward portion 42 is pivotally secured at its center to the underside of the yoke of the U-shaped member 21, by means of the bolt 45.

Figure 2:
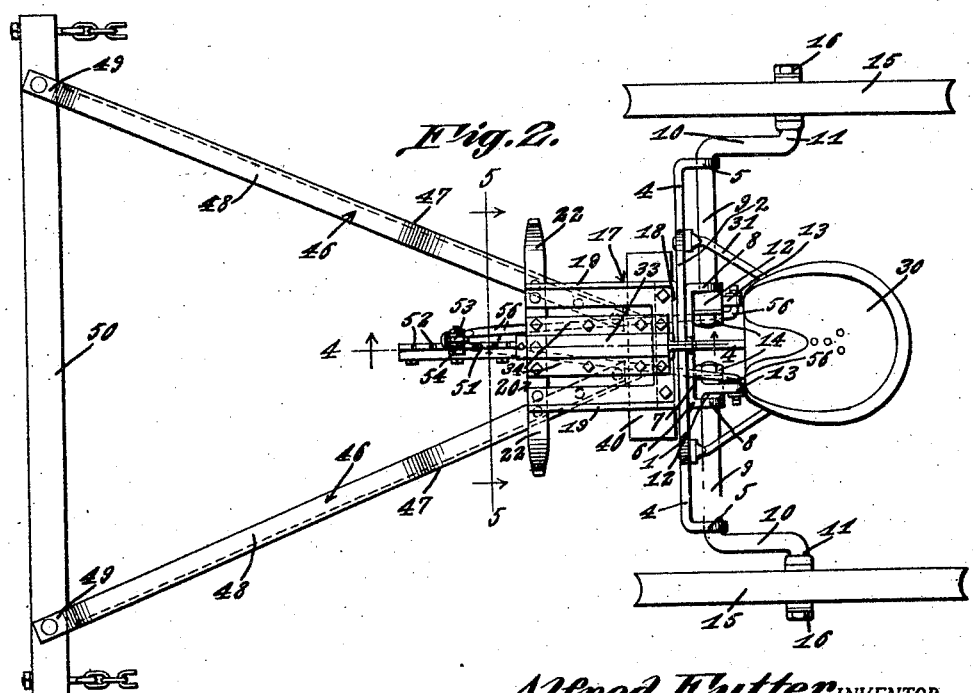
Figure 2 is a top plan view of the same.

Secured to the underside of the draft tongue supporting plate 41 is a pair of draft tongues 46 which extend forwardly of the vehicle in divergent relation as shown in Figure 2. These draft tongues are bent as at 47 to cause the portions 48 to be directed downwardly so that the horizontally directed forward portions 49 may be secured to a low lying implement such as a harrow by means of the cross connecting beam 50 which extends between and connects the ends 49 of the draft tongue.

Secured to the squared portion 26 of the shaft 23 is a sector 51 having the notches 52 therein and pivotally secured to the portion 26, at the central part of the sector is a shifter lever 53, the lower end of which extends a substantial distance beneath the shaft 23 and the elements carried thereon. A sector engaging device is carried by the lever as indicated at 54, as is usual with levers of this type.

Pivotally connected to the lower end of the lever 53 by means of the pivot bolt 55 is a pair of rearwardly extending links 56, each of which is connected to the outer end of one of the arms 13 carried by and extending from the axle 9.

As is clearly shown in Figure 1 of the drawings, when the centers of the traction wheels 15 are in the same plane, one of the arms 13 will be directed upwardly and rearwardly from its supporting axle whereas the other one of the arms 13 will be directed downwardly and rearwardly from its supporting axle.

From the foregoing description it will be readily seen that when the bar 50 is attached to a harrow and the same drawn forward, the riding attachment will follow therebehind and the rider taking his position upon the seat 30 can attend to the harrow without trouble and will not be compelled to walk therebehind as is the usual process. In the event that the harrow is running over uneven ground, the driver manipulates the lever 53 to shift the arms 13 as desired, to swing the axles 9 and thus raise or lower the traction wheel to suit the vehicle's inclination to the ground over which it is traveling, to maintain the seat 30 at all times in a horizontal position.

Due to the manner in which the shafts 46 are secured to the plate 41 the harrow may be swung to one side or the other without immediately swinging the riding attachment and, in the event that the harrow passes over a section of ground having a different slope from the slope of the ground upon which the riding attachment is running, the structure supported from the bearing member 33 will revolve about the portion 25 of the shaft 23 and no strain will be placed upon any part of the riding attachment structure.

This harrow attachment is particularly adapted to and intended for use upon hill sides and in such use the driver's seat may be maintained in horizontal position at all times as pointed out.

Having thus described my invention what I claim is:—

1. A harrow riding attachment of the character described, comprising a frame structure, aligned bearings carried thereby, a pair of aligned axles carried in said bearings, each axle having its outer end offset, a wheel carried upon each offset end, means for pivotally connecting said attachment to a harrow, and means for oscillating said axles to synchronously shift said wheels in opposite directions.

2. A riding attachment for harrows, comprising an upstanding frame, a beam carried transversely thereon, aligned bearing elements upon said beam, a pair of aligned axles carried in said bearings and having parallel offset outer ends, a traction wheel carried upon each outer end, an arm extending at right angles from each axle, means connected with each arm for oscillating said axles to synchronously swing said wheels in opposite directions, and means pivotally carried by said attachment for hitching the same to a harrow.

3. A harrow riding attachment of the character described, comprising an upright inverted substantially U-shaped frame, a beam extending transversely of the free ends of the legs of the frame, aligned bearings upon each side of the central part of said beam, a pair of aligned shafts carried by said bearings each formed to set up a crank at the outer end thereof, a traction wheel upon the crank of each shaft, means connected with said shafts for oscillating the same to synchronously swing said wheels in opposite directions, and means for connecting the attachment to a harrow.

4. A riding attachment of the character described, comprising an upright inverted substantially U-shaped frame, a beam extending transversely of the free ends of the legs of the frame, aligned bearings upon each side of the central part of said beam, a pair of aligned shafts carried by said bearings each formed to set up a crank at the outer end thereof, a traction wheel upon the crank of each shaft, oppositely directed arms each carried by a shaft, an operating link connected to, and extending forwardly from, each arm, a control lever common to said links and adapted to simultaneously shift the same, and the arms connected thereto, to synchronously swing the wheels in opposite directions, and means for connecting the attachment to a harrow.

In testimony whereof, I affix my signature hereto.

ALFRED FUTTER.